Aug. 25, 1964  G. EVEN  3,145,620
DIMINUTIVE TWO-MEN TANK VEHICLE BODY
Filed March 9, 1962  2 Sheets-Sheet 2

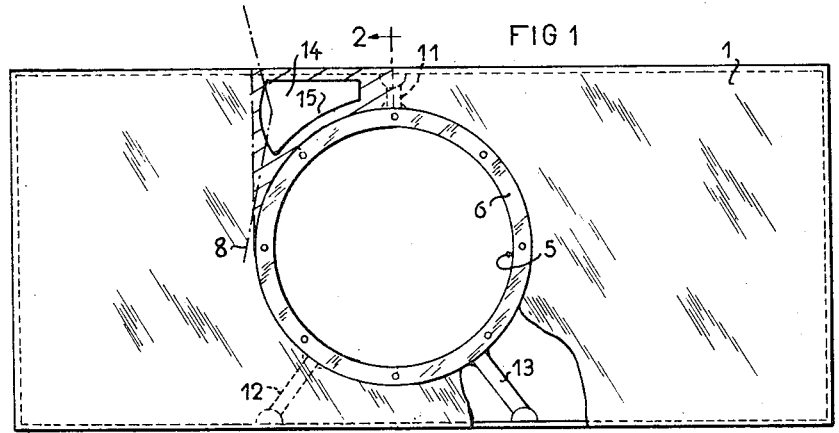
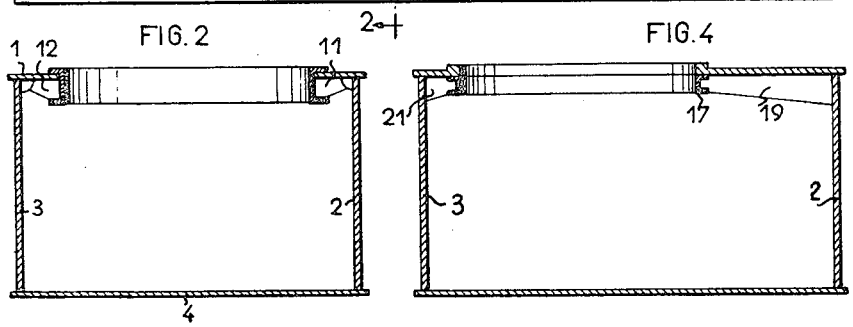
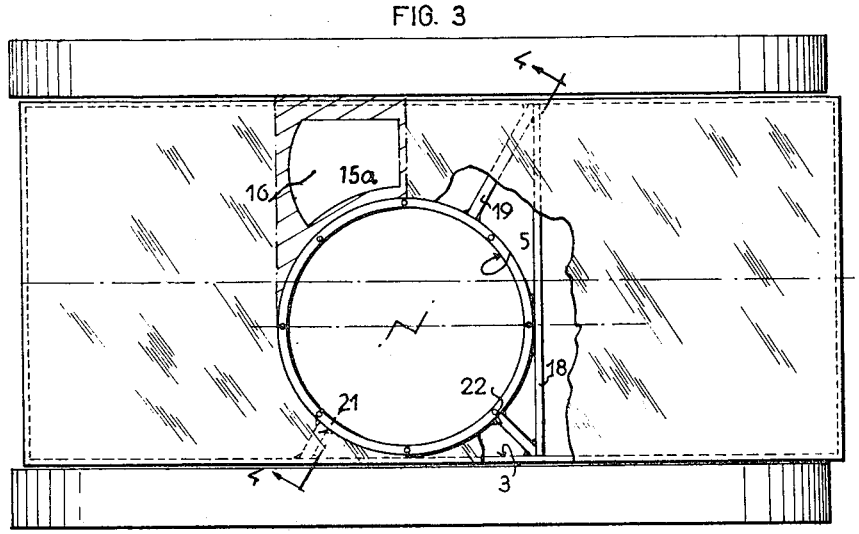

United States Patent Office 3,145,620
Patented Aug. 25, 1964

3,145,620
DIMINUTIVE TWO-MEN TANK VEHICLE BODY
Georges Even, 7 Ave. Pierre Grenier,
Boulogne, Seine, France
Filed Mar. 9, 1962, Ser. No. 178,672
Claims priority, application France Apr. 10, 1957
4 Claims. (Cl. 89—36)

This application is a continuation-in-part of my copending application filed May 13, 1957, Serial Number 658,605, now Patent No. 3,024,704.

This invention relates to a diminutive tank vehicle supporting a rotatable turret and adapted to be operated by two crew members, viz. a gunner operating within the turret and a driver positioned at a point spaced from the turret axis by a radial distance greater than that of the edge of the circular turret opening formed in the top wall of the vehicle body.

In constructing such diminutive two-men tank vehicle body, it is quite a problem to locate the observation opening for the driver in a flat median top wall portion of the body so as to permit the greatest possible reduction of the overall size of the tank vehicle. In fact, if the observation opening is located in front of the turret the length of the tank becomes prohibitive, whereas if the observation opening is disposed at one side of the turret opening on a same transverse axis therewith, the field of vision of the driver becomes limited on one side by the turret.

The main object of this invention is to provide a diminutive two-men tank vehicle body as set forth, in which the observation opening is so located with respect to the turret as to permit reduction of the tank body to the minimum possible size while offering to the driver the maximum possible field of vision.

In accordance with the invention, the two-men tank vehicle body comprises a flat substantially horizontal median top wall portion extending transversely between the two side walls of the body and lengthwise between a forwardly and downwardly front wall portion and a rearwardly and downwardly inclined rear wall portion, said median top wall portion being provided with a circular turret opening the radius of which corresponds substantially to one third of the width of the median top wall portion, and with an observation opening through which the head of the driver may pass and which is normally covered by an overhead protecting hood, said observation opening being located within a zone of the median top wall portion defined between a first vertical transverse plane extending substantially tangential to the edge of the turret opening, a second vertical transverse plane extending substantially through the center of the turret opening, an edge portion of the median top wall portion between said first and second transverse planes, and another edge portion adjacent the edge of the turret opening and extending substantially 90° of the turret opening between said first and second transverse planes, the observation opening having an edge which is arcuate and concentric with respect to the turret opening, and with the radius of said arcuate edge being only slightly greater than the radius of the turret opening so as to leave only a narrow strip of material between the turret opening and the observation opening.

It will be understood that such narrow strip of material weakens the top wall of the tank body at a region particularly subjected to the weight of the heavy turret and that it is necessary to relieve the edge of the turret opening of flexure and torsion stresses resulting from deformations of the tank body, and more particularly at the narrow strip of material between the turret opening and the observation opening. However, it is not possible to support the circular edge of the turret opening by any conventional supporting structure comprising four or more supporting elements such as braces or webs extending radially from equally spaced points of the circumference of the turret opening to the side walls of the tank body without having one of the four supporting members extending across the space to be occupied by the driver.

It is therefore a further object of this invention to provide a specific supporting structure adapted to support the edge of the turret opening at only three circumferentially spaced points thereof located without the said edge portion of substantially 90° of the turret opening.

For a better understanding of the invention, reference may be had to the accompanying drawings, in which:

FIG. 1 is a plan view of a flat top wall portion of a two-men tank body provided, in accordance with the invention, with a turret opening having its center on the longitudinal axis of the body, mounting means for the edge of the turret opening, and an observation opening located in a well-defined zone;

FIG. 2 is a vertical sectional view along line 2—2 of FIG. 1;

FIG. 3 is a view similar to that of FIG. 1, of an alternative embodiment in which the turret opening is offset with respect to the longitudinal axis of the body.

FIG. 4 is a sectional view along line 4—4 of FIG. 3, and

Figure 5:
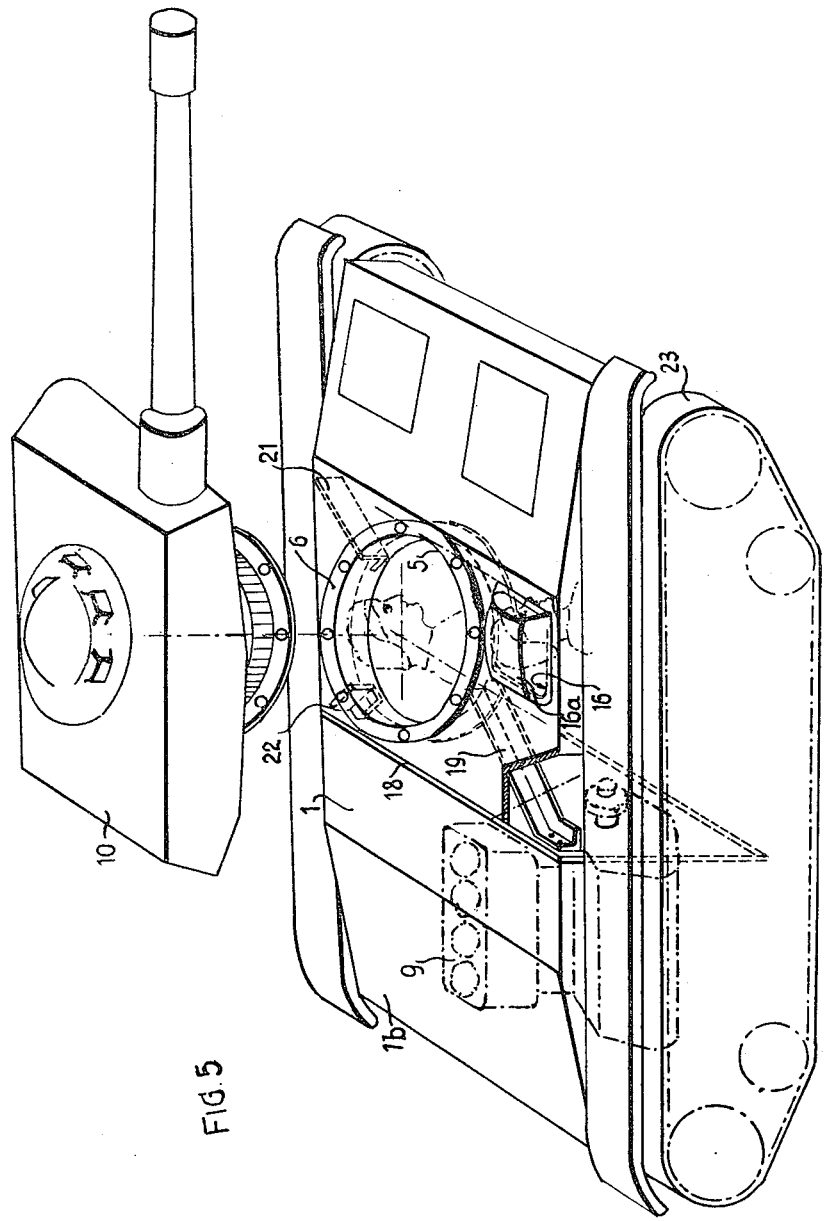
FIG. 5 is a perspective view of a tank vehicle provided with a flat top wall portion as shown in FIGS. 3 and 4.

In the embodiment shown in FIGS. 1 and 2, the body of a diminutive two-men tank vehicle comprises a flat top wall portion 1, two side walls 2 and 3, and a bottom wall 4. The flat top wall portion 1 is provided with a circular opening 5 the radius of which corresponds to approximately one third of the width of the flat top wall portion 1. The edge of opening 5 is reinforced by a ring 6 having a U-shaped cross-section, and which is intended to support a roller track for a rotatable turret adapted to cover the opening 5 and carrying one or more weapons. The observation required to drive the vehicle is ensured by an opening 14 located within a well-defined zone (cross-hatched in FIG. 1) at the flat top wall portion 1, said zone being comprised between the edge of the central opening 5 and one of the longitudinal edges of the vehicle, and being furthermore limited, at its front end, by a vertical transverse plane substantially tangential to the edge of the turret opening 5 and, at its rear end, by a vertical transverse plane substantially passing through the center of the turret opening 5. The observation opening 14 has an arcuate edge 15 concentric with respect to ring 6 and extending substantially 90° of the latter between said first and second vertical transverse planes. The radius of the arcuate edge 15 is only slightly greater than the radius of ring 6 so as to leave between the openings 5 and 14 an arcuate relatively narrow strip of material. Owing to this arrangement, it may be seen that the tank body may be reduced to the minimum possible size and that the field of vision of the driver is not impaired by the turret, as shown by the oblique visual ray 8.

The roller track on the ring 6 should remain always perfectly flat to ensure suitable rolling of the turret. It is therefore necessary to protect the roller track against the influence of the deformations of the tank body. This is the reason why, in the embodiment shown in FIGS. 1 and 2, the ring 6 not only offers a high rigidness of its own, but is moreover supported also very rigidly on the upper edges of three webs 11, 12 and 13 welded on the internal faces of the side walls 2 and 3 of the vehicle body at three points spaced along the arcuate portion of ring 6 which joins the ring portion of 90° delimiting the zone for the observation opening 14. In these conditions, the said three points determine a plane in which ring 6 is continuously maintained so that it is not subjected to deformations of the vehicle body walls and in particular to the deformations of the top wall, and none of the three webs will extend radially from ring 6 across or near the observation opening 14.

In the alternative embodiment shown in FIGS. 3 and 4, the turret opening 5 is offset towards the left side of the tank body, and preferably so that the upper edge of the left side wall 3 of the tank body extends substantially tangential to opening 5. In this modification, the observation opening 16, somewhat larger than the observation opening 14 shown in FIG. 1, is located as previously in the above-defined zone and comprises an arcuate edge 15a concentric with ring 17 (FIG. 4) which is of smaller width than that of ring 6 of FIG. 1. In order that ring 17 nevertheless remains in a stationary plane in spite of the deformations of the vehicle body, said ring is made rigid with the upper edges of side wall 3 and of a vertical transverse wall 18 of the vehicle body. The ring 17 is furthermore reinforced by means of three webs 19, 21, 22 extending radially from three circumferentially spaced points of ring 17, these three points lying all without the ring portion of 90° delimiting the above-defined zone for the observation opening 16. The outer end of web 21 is secured to side wall 3, the outer end of web 22 to side wall 3 and transverse wall 18, and the outer end of web 19 to wall 18 and the side wall 2 of the tank body.

In FIG. 5 I have diagrammatically illustrated a diminutive two-men tank vehicle incorporating the top wall construction described with reference to FIGS. 3 and 4 and permitting to reduce the overall size of the tank to a minimum. The body of the tank illustrated comprises a bottom wall, two side walls, and the flat substantially horizontal top wall portion 1 extending transversely between the two side walls and longitudinally between a forwardly and downwardly inclined front portion 1a and a rerawardly and downwardly inclined rear portion 1b. The flat top wall portion 1 is provided with the circular turret opening 5 the radius of which is substantially equal to one third of the width of top wall portion 1, the ring 6 mounted within opening 5 for supporting the rotatable turret 10, and the observation opening 16 located in the above-defined zone and covered by an overhead protecting hood 16a provided with a front opening.

A vertical transverse wall 18 divides the tank body into an engine compartment containing the motor 9 for propelling the vehicle, and a passenger or fighting compartment adapted to receive the driver of the vehicle, the gunner, and ammunition (not shown). The seat for the gunner is disposed below the turret opening 5 and the seat for the driver is disposed in such a manner within the fighting compartment that the driver may pass his head through the observation opening 16 and view through the front opening of hood 16a.

The ring 6 is maintained in a plane determined by the three gussets 19, 21 and 22 secured at one end to ring 6 and at the other end to wall 18 and the side walls of the tank body, respectively, as described with reference to FIGS. 3 and 4. In addition to the three radially extending supporting elements 19, 21 and 22 for holding ring 6 in a stationary plane with respect to the tank body, ring 6 may be directly secured by any suitable means such as, for example, by welding, to side wall 3 and to partition 18 at points thereof lying nearest to ring 6.

The tank vehicle is further provided with conventional tracks 23, 24 adjacent the side walls of the tank body and driven by motor 9.

I have not considered it necessary to illustrate in detail the turret and gun mountings, power plant, transmission system, tracks, etc., as they form no part of the present invention. All these parts may be standard equipment as at present used.

From the foregoing description it will be seen that a tank vehicle adapted to be operated by two crew members, as distinguished from a tank vehicle adapted to be operated by one man or by at least three crew members, and provided with the top wall construction 1, 5, 14 (or 16) and 11 to 13 (or 19, 21, 22) of my present invention may be of the greatest possible diminutiveness, particularly with respect to the length of the vehicle. Actually, a practical embodiment of a two-men tank vehicle constructed in accordance with the present invention, to be used as a fighting vehicle and provided with a rotatable turret carrying a comparatively heavy gun, may be as small as a conventional compact four-seater motor car driven by a low powered motor.

Other forms and immaterial modifications of the present invention, both with respect to its general arrangement and the details of its respective parts, which may become obvious to those skilled in the art after reading the present description, are intended to come within the scope and spirit of this invention as more fully set forth in the appended claims.

What I claim is:

1. In a diminutive tank vehicle defined by a hollow body adapted to be operated by two occupants, said hollow body having a bottom wall, two opposite spaced apart side walls and a top wall including a substantially horizontal flat median portion extending between said two side walls, said flat top wall portion being provided with a circular opening the radius of which is substantially equal to one third of the width of said flat top wall portion, a ring mounted within the opening adapted for supporting a turret, three radially extending supporting elements supporting the ring at three circumferentially spaced points, one of said elements being secured to one of said side walls and the other two elements being secured to the other side wall, the flat top wall portion also being provided with an observation opening through which the head of one of the two occupants may pass, said observation opening being located within a zone of said flat top wall portion defined between a first vertical transverse plane extending substantially tangential to said ring, a second vertical transverse plane extending substantially through the center of said ring, an edge portion of the flat top wall portion between said first and second transverse planes and a portion of substantially 90° of said ring between said first and second transverse planes, said observation opening having an edge which is arcuate and concentric with respect to said ring with the radius of said arcuate edge being only slightly greater than the radius of said ring so as to leave a narrow strip of material between said observation opening and the turret opening, and said circumferentially spaced points lying outside said portion of substantially 90° of the ring.

2. In a diminutive tank vehicle defined by a hollow body adapted to be operated by two occupants, said hollow body having a bottom wall, two opposite spaced apart side walls, and a top wall including a forwardly and downwardly inclined front portion, a rearwardly and downwardly inclined rear portion and a substantially horizontal flat portion located between said front and rear portions of the top wall and extending between said two side walls of the hollow body, said horizontal top wall portion being provided with a circular opening the radius of which is substantially equal to one third of the width of said horizontal top wall portion, a ring mounted within the opening adapted for supporting a turret, the horizontal top wall portion also being provided with an observation opening through which the head of one of said two occupants may pass, said observation opening being located within a zone of said horizontal top wall portion defined between a first vertical transverse plane extending substantially tangential to said ring at a point thereof nearest said front portion of the top wall, a second vertical transverse plane extending substantially through the center of said ring, an edge portion of the horizontal top wall portion between said first and second transverse planes, and a portion of substantially 90° of said ring between said first and second transverse planes, said observation opening having an edge which is arcuate and concentric with respect to said ring with the radius of said arcuate edge being only slightly greater than the radius of said ring so as to leave only a narrow strip of material between said observation opening and the turret opening, a forwardly open overhead protecting hood on said horizontal top wall portion covering said observation opening, a fixed transverse member in said body joining said two opposite side walls and extending substantially tangential to said ring at a point thereof nearest said rear portion of the top wall, and three radially extending supporting elements supporting said ring at three circumferentially spaced points lying outside the portion of substantially 90° of the ring, one element being secured to one of said two side walls and the other two elements being secured each to one of the two side walls, respectively, and also to said transverse member.

3. In a diminutive tank vehicle defined by a hollow body adapted to be operated by two occupants, said hollow body having a bottom wall, two opposite spaced apart side walls, and a top wall including a forwardly and downwardly inclined front portion, a rearwardly and downwardly inclined rear portion and a substantially horizontal flat median portion located between said front and rear portions of the top wall and extending between said two side walls of the hollow body, said horizontal top wall portion being provided with a circular opening the radius of which is substantially equal to one third of the width of said horizontal top wall portion and the center of which is offset with respect to the longitudinal axis of the hollow body so that one of said side walls thereof extends substantially tangential to said ring, a transverse partition in said body for dividing the same into an engine compartment and a compartment adapted to receive the two occupants, said partition extending substantially tangential to said ring at a point thereof nearest said rear portion of the top wall, a ring mounted within said opening adapted for supporting a rotatable turret, the horizontal top wall portion also being provided with an observation opening through which the head of one of said two occupants may pass, said observation opening being located within a zone of said horizontal top wall portion defined between a first vertical transverse plane extending substantially tangential to said ring at a point thereof nearest said front portion of the top wall, a second vertical transverse plane extending substantially through said center of the ring, an upper edge portion of the side wall of said body opposite said one side wall thereof and extending between said first and second transverse planes, and a portion of substantially 90° of said ring between the point thereof nearest said front portion and a point of the ring nearest said upper edge portion, said observation opening having an edge which is arcuate and concentric with respect to said ring with the radius of said arcuate edge being only slightly greater than the radius of said ring so as to leave only a narrow strip of material between said observation opening and the turret opening, an overhead protecting hood above said observation opening, means for securing said ring to said one side wall and to said partition at a point of said one side wall and at a point of said partition nearest said ring, and three radially extending supporting elements supporting said ring at three circumferentially spaced points lying outside the portion of substantially 90° of the ring, one of said elements being secured to said one side wall and the other two elements being secured each to one of said two side walls, respectively, and also to said partition.

4. In a diminutive tank vehicle adapted to be operated by two occupants, wall means defining a hollow body and including laterally spaced side walls and a top wall having substantially less width than length, said top wall having a flat surface at least in its median portion, said surface extending between said side walls, said flat surface being provided with a circular opening therein providing a turret supporting edge and having a diameter substantially in excess of one half the distance between said spaced side walls, the vertical axis of said opening lying to one side of the longitudinal median line of the vehicle, said flat surface further having an observation opening therein in the same plane as and disposed in a quadrant zone about said first opening that is defined between the side wall remote from the axis of the first opening and longitudinally spaced parallel transverse planes extending respectively tangentially of and bisecting said first opening, said second opening having an arcuate edge closely adjacent the circumference of said first opening so as to leave only a narrow strip of material between said first opening and said observation opening, and means for maintaining said first opening in a same plane with respect of the hollow body in spite of deformations thereof.

References Cited in the file of this patent
UNITED STATES PATENTS

| | | |
|---|---|---|
| 2,175,852 | Perkins | Oct. 10, 1939 |
| 2,344,730 | Ramsey | Mar. 21, 1944 |
| 2,726,577 | Schlindel | Dec. 13, 1955 |

OTHER REFERENCES

Army Ordnance, vol. XXIV, No. 137, March–April 1943. (Page 308 relied upon.)